US006805937B1

(12) United States Patent
Toth

(10) Patent No.: US 6,805,937 B1
(45) Date of Patent: Oct. 19, 2004

(54) WINDOW SCREEN PATCH SYSTEM

(76) Inventor: Brian R. Toth, 280 N. Main St., Glenn Ellyn, IL (US) 60137-5354

(*) Notice: Subject to any disclaimer, the term of this patent is extended or adjusted under 35 U.S.C. 154(b) by 0 days.

(21) Appl. No.: 10/253,165

(22) Filed: Sep. 24, 2002

Related U.S. Application Data

(60) Provisional application No. 60/325,028, filed on Sep. 25, 2001.

(51) Int. Cl.$^7$ .................................................. B32B 3/06

(52) U.S. Cl. ........................... 428/99; 29/402.09; 245/2

(58) Field of Search .................. 428/63, 99; 29/402.09; 245/1, 2; 24/450, 442

(56) References Cited

U.S. PATENT DOCUMENTS 1,324,845 A 12/1919 Osgood
1,749,755 A * 3/1930 Downer .......................... 245/2
3,412,437 A * 11/1968 Bennett ....................... 411/509
4,163,817 A 8/1979 DiCarlantonio et al. ...... 428/33
4,222,162 A 9/1980 Levy et al. .................... 29/402
5,997,982 A 12/1999 Susat .......................... 428/100

* cited by examiner

*Primary Examiner*—Alexander S. Thomas
(74) *Attorney, Agent, or Firm*—Head, Johnson & Kachigan

(57) ABSTRACT

A screen repair apparatus for a damaged screen cloth having vertical and horizontal strands. The apparatus includes a flexible body forming a closed periphery and a screen cloth bounding the body. A plurality of fasteners extend vertically from a plane formed by the flexible body and the repair screen cloth, wherein the fasteners are receivable in openings formed by the vertical and horizontal strands.

5 Claims, 2 Drawing Sheets

WINDOW SCREEN PATCH SYSTEM

CROSS-REFERENCED TO RELATED APPLICATIONS

Priority is claimed from provisional application U.S. Ser. No. 60/325,028 filed on Sep. 25, 2001, and incorporated by reference herein.

BACKGROUND OF THE INVENTION

1. Field of the Invention

This invention relates to the field of screen repair and more specifically to a patching system and method for repairing a screen having a defect in it. Known art may be found in U.S. class 29, subclass 402.09 and related classes and subclasses.

2. Prior Art

Various types of screens have been employed in the past although screens composed of woven wire have proven both effective and cost efficient. In woven wire screens, warp wires run lengthwise during the weaving process and are crossed at right angles by the shute wires.

Screens in doors, windows and elsewhere often become torn, cut, or otherwise damaged throughout their useful life. When the screens are damaged, insects or other undesirable creatures can pass through the screen, thereby defeating the function of the screen. The known art has recognized this problem and several proposed solutions have been made therein.

Damage to a conventional wire mesh screen is typically in the nature of a tear or rip which will often take the form of an elongated separation of adjoining metal wires in the mesh. It is unlikely that a wire mesh screen will be damaged radially in that the damaging event typically dissipates energy in a longitudinal fashion as successive wires in the mesh break. Thus, the repair of a tear or rip or other damage in a wire mesh screen can often be accomplished by placing the broken wire mesh fragments in close proximity to one another and subsequently holding the fragments adjacent one another. The known art addresses small rips or tears but it does not adequately address large rips or tears. A large radial area of damage with a section of wire mesh broken away from the window or door is not as common. In such circumstances, the known art fails to provide an adequate device for patching and repairing such breaks.

One solution to the dilemma is to replace the entire screen itself. This involves taking the screen from its position and then subsequently removing the damaged screen from its framing and replacing it with undamaged screen. This is time-consuming and especially wasteful if the damaged section of screen is not overly large. Several repair solutions have also been proposed.

A common repair technique has been to secure a single patch of screen material or the like as a cover on the screen over the defect. The known patches are generally difficult to employ and often unsightly. Further, the known patches can have protruding wires, fasteners and the like that can injure the repair person or others using the screen. Examples of known art can be seen in U.S. Pat. No. 1,324,845 to Osgood; U.S. Pat. No. 1,792,594 to Litwin; U.S. Pat. Nos. 2,272,196 and 2,283,803 to Gittins, and the like.

These devices do not adequately address several problems associated with adequately repairing damaged wire mesh screens such as those found on windows and doors. Furthermore, the devices fail to provide unitary patches that may be placed in an abutting configuration to efficiently repair large longitudinal and radial tears and rips.

SUMMARY OF THE INVENTION

The present invention addresses the above referenced need in the art for an improved system for patching wire mesh screens. The present invention enables the user to quickly and efficiently repair a wire mesh screen on a window or door. The present invention also permits the user to repair large elongated tears in a wire mesh screen as well as to repair radial tears in a wire mesh screen.

Conventional wire mesh screens commonly found on doors, windows and elsewhere are normally 2-3/1000 ths of an inch in diameter. Typically, the wire mesh is formed from aluminum or similar soft metal that is relatively light. The typical perimeter of a hole or opening formed by a conventional window or door wire mesh screen is approximately 5/1000 ths of an inch and such holes typically have a square cross-section.

The present invention includes a flexible body that forms an exterior perimeter for a flexible mesh screen. The body includes a plurality of spaced apart and, ideally, uniform fasteners. The fasteners permit a user to secure the body adjacent a damaged section of screen.

The body may assume several geometric shapes. Preferred cross-sectional outlines include a circle or a square for the body. The body may also assume the outline of a rectangle or an oval as well.

In one exemplary embodiment, four fasteners extending from the body are employed to secure the body to a screen section although a greater number may be employed if desirable. In another exemplary embodiment, the body has a circular outline with regularly spaced apart fasteners.

In another exemplary embodiment, the body has a square outline with fasteners located at each corner of the square. Other configurations are possible as well.

The apparatus of the present invention may be used to repair elongated tears or to reattach sections of screen broken away by a radial tear. When repairing an elongated tear, a single body may be deployed or multiple bodies may be deployed in an abutting fashion. When repairing a radial tear, a plurality of bodies may be deployed in an abutting relationship to reattach the damaged section of mesh to the mesh sections still in place upon the window or door.

Thus, a principal object of the present invention is to provide an apparatus that may be easily deployed to repair a conventional wire mesh screen.

Another object of the present invention is to provide an apparatus that may be deployed in an abutting fashion to facilitate the repair of an elongated or radial tear in a conventional wire mesh screen.

Another object of the present invention is to provide an apparatus that may be deployed with a minimal amount of instruction and tools.

Another object of the present invention is to provide an apparatus that facilitates continued use of existing wire mesh screens.

DETAILED DESCRIPTION OF THE PREFERRED EMBODIMENTS

Figure 1:
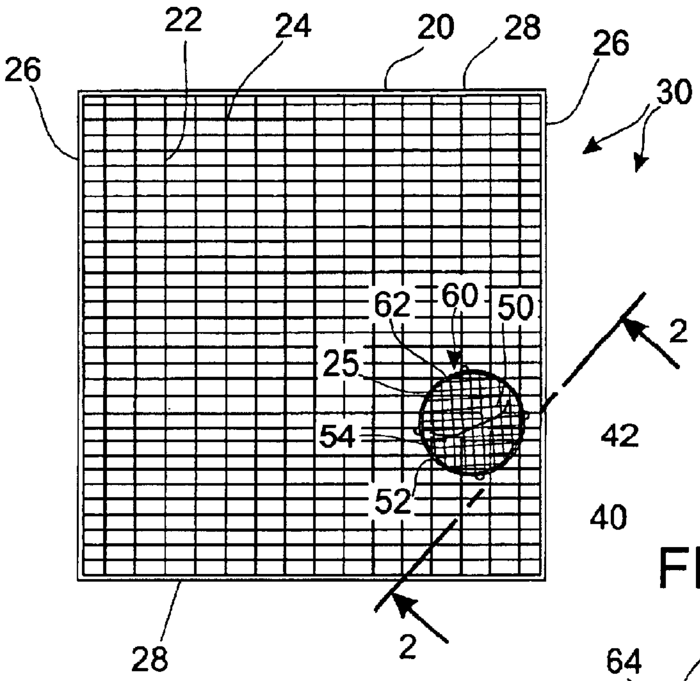
FIG. 1 is an environmental view showing a window screen patch system constructed in accordance with the present invention in use with a screen window.
Figure 2:
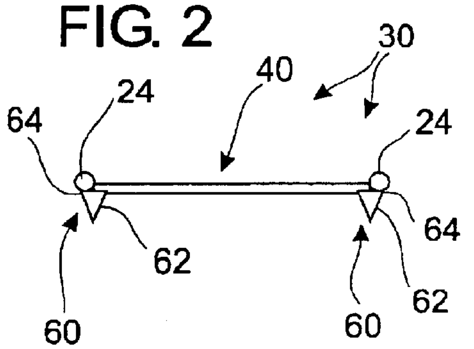
FIG. 2 is a cross-sectional view thereof taken along line 2—2 of FIG. 1.
Figure 3:
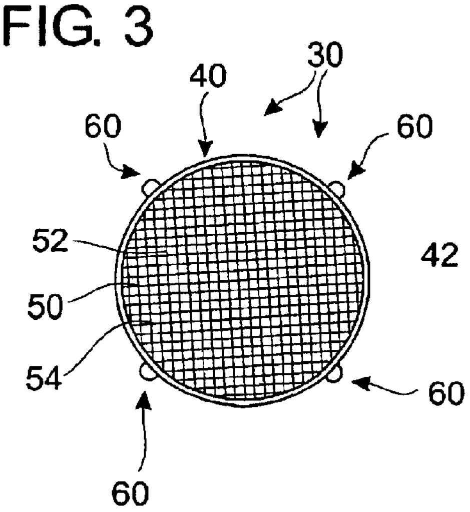
FIG. 3 is a top plan view of an exemplary embodiment of the present invention.
Figure 4:
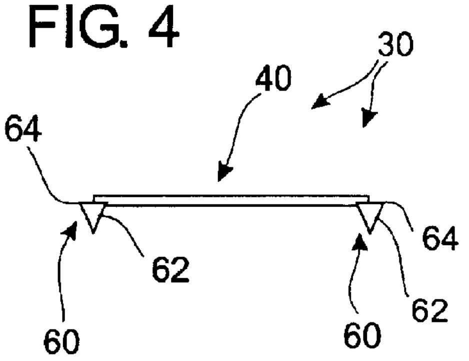
FIG. 4 is an end elevational view thereof.
Figure 5:
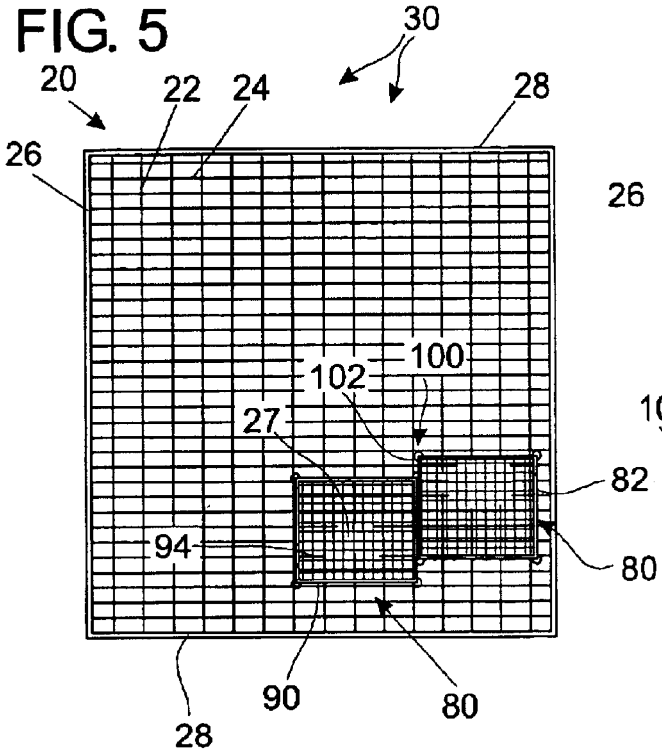
FIG. 5 is an environmental view showing an alternate embodiment of a window screen patch system in accordance with the present invention in use with a screen window.
Figure 6:
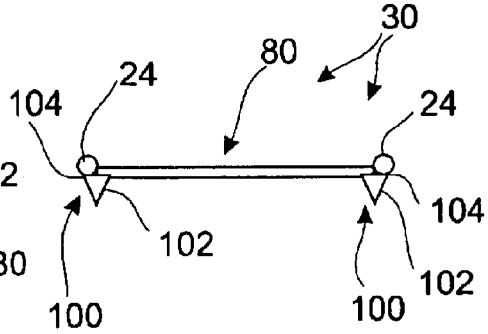
FIG. 6 is a cross-sectional view thereof taken along line 5—5 of FIG. 1.
Figure 7:
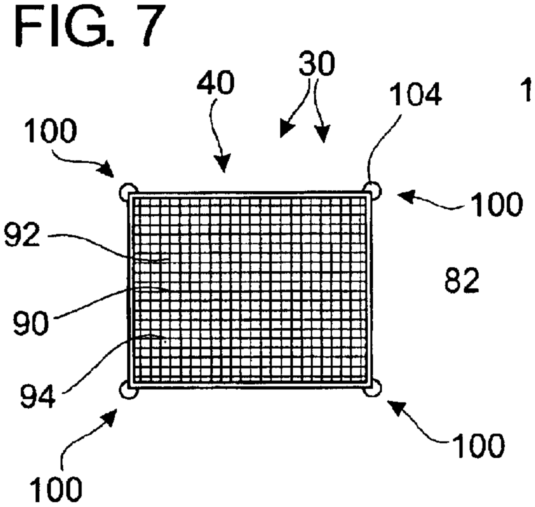
FIG. 7 is a top plan view of an exemplary embodiment of the present invention.
Figure 8:
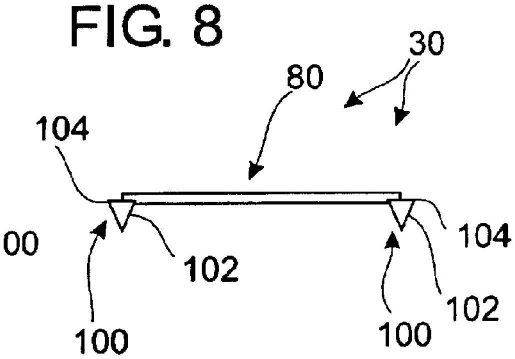
FIG. 8 is an end elevational view thereof.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention addresses a need in the art for an apparatus to efficiently and quickly repair conventional screens. A preferred embodiment of the improved screen repair apparatus in accordance with the present invention is generally designated by reference numeral 30 in FIGS. 1 through 8. The apparatus 30 may be deployed upon a conventional mesh screen cloth 20. The screen cloth may be constructed of conventional wire strands, plastic or other materials. Such conventional wire mesh screens 20 typically include a plurality of vertically oriented elongated wires 22 and horizontally oriented elongated wires 24 extending between spaced apart, vertically oriented frames 26 and spaced apart, horizontally oriented frame members 28. The wires are conventionally designated as warps and shutes.

When new, the wires 22 and 24 are woven criss-cross to form a tightly interwoven pattern that prevents the intrusion of unwanted debris and/or insects and the like through wire mesh screen 20. However, over time it is not unusual nor uncommon for the screen 20 to become damaged in some fashion. Typically, the damage is in the form of an elongated tear or rip 25. When such damage occurs, the screen user must either replace the entire screen 20 or repair the tear 25. The improved apparatus 30 enables the user to easily repair tear 25.

Patch 30 includes a preferably flexible body 40. In FIGS. 1 through 4, an exemplary embodiment of the invention 30 shows a body 40 with a circular periphery. Body 40 bounds an internal mesh screen 50 comprised of spaced apart vertically oriented strands 52 and spaced apart horizontally oriented strands 54. The body 40 also includes a plurality of integral fasteners 60 extending from and regularly spaced apart the periphery of body 40.

Each fastener 60 includes a preferably pyramidial body 62 with a partially exposed or cut away base 64. Each fastener 60 is adapted to be placed under a respective wire 22 or 24 of the mesh 20 when the repair patch 30 is deployed upon a screen 20. In such a fashion, the fasteners 60 secure the patch 30 to the mesh 20.

In FIGS. 5 through 8, another exemplary preferred embodiment of the invention 70 shows a patch 30 with a preferably flexible body 80 with a periphery having a rectangular cross-section. Body 80 bounds an internal mesh screen 90 comprised of spaced apart vertically oriented strands 92 and spaced apart horizontally oriented strands 94. The body 80 also includes a plurality of integral fasteners 100 regularly spaced apart the periphery of body 80.

Each fastener 100 includes a preferably pyramidial body 102 with a partially exposed base 104. Each fastener 100 is adapted to be placed under a respective wire 22 or 24 of the mesh when the repair patch 70 is deployed upon a screen 20. In such a fashion, the fasteners 100 secure the patch 70 to the mesh 20 to repair tear 27.

When a tear 25, 27 exceeds the size of a single patch 40, 180, additional patches 40, 80 may be deployed. Such an arrangement is shown for example in FIG. 5.

Figure 9:
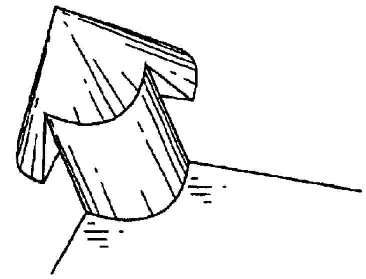
FIG. 9 is an enlarged view of a body of a fastener of the present invention.

FIG. 9 illustrates an enlarged view of a body 62 of a fastener 60. The fastener 60 extends vertically from a plane formed by the flexible body and the repair screen. The fastener 60 has a first cylindrical portion and a second conical portion with a partially exposed or cut away base.

Whereas, the present invention has been described in relation to the drawings attached hereto, it should be understood that other and further modifications, apart from those shown or suggested herein, may be made within the spirit and scope of this invention.

What is claimed is:

1. A screen repair apparatus for a damaged screen cloth having vertical and horizontal strands, which comprises:

a flexible body forming a closed periphery;

a screen cloth bounding said body;

a plurality of fasteners extending vertically from a plane formed by said flexible body and said repair screen cloth, wherein said fasteners are receivable in openings formed by said vertical and horizontal strands; and wherein each said fastener includes a first cylindrical portion extending vertically from said plane and a second conical portion extending from said first cylindrical portion wherein said conical portion has a diameter larger than said openings and wherein said conical portion has a partially exposed or cut-away base.

2. A screen repair apparatus as set forth in claim 1 wherein said flexible body and said plurality of fasteners are integral and fabricated from plastic.

3. A screen repair apparatus as set forth in claim 1 wherein said flexible body is circular.

4. A screen repair apparatus as set forth in claim 1 wherein said flexible body is square.

5. A method to repair a damaged screen having vertical and horizontal strands, which method comprises:

placing a screen repair apparatus having a flexible body forming a closed periphery and a screen cloth bounding said body over a damaged portion of said screen;

inserting a plurality of fasteners extending vertically from a plane formed by said flexible body and said repair screen cloth through openings formed by said vertical and horizontal strands wherein each said fastener includes a first cylindrical portion extending vertically from said plane and a second conical portion extending from said first cylindrical portion wherein said conical portion has a diameter larger than said openings and wherein said conical portion has a partially exposed or cut-away base.

* * * * *